United States Patent [19]
Klein, Jr.

[11] 3,785,676
[45] Jan. 15, 1974

[54] BICYCLE STEM LOCK

[76] Inventor: Frank F. Klein, Jr., 2049 W. 63rd St., Chicago, Ill. 60636

[22] Filed: Apr. 26, 1971

[21] Appl. No.: 137,692

Related U.S. Application Data

[60] Division of Ser. No. 771,080, Oct. 28, 1968, Pat. No. 3,660,995, which is a continuation-in-part of Ser. No. 618,004, Feb. 23, 1967, abandoned.

[52] U.S. Cl................ 280/279, 280/289, 280/281, D90/8, D90/9, D90/11
[51] Int. Cl............................................. B62k 19/32
[58] Field of Search................... 280/279, 280, 289, 280/276; 70/233, 187; D90/8, 9, 11

[56] References Cited
UNITED STATES PATENTS
2,358,035   9/1944   Schwinn............................ 280/279

3,306,684   2/1967   Klein, Jr. ...................... 280/279 X
1,883,033   10/1932   Snell................................. 280/279

FOREIGN PATENTS OR APPLICATIONS
711,578   8/1938   Germany............................. 70/187
808,739   2/1937   France................................. 280/279
646,745   6/1935   Germany............................. 280/279
571,105   12/1931   Germany............................. 280/279

*Primary Examiner*—Kenneth H. Betts
*Assistant Examiner*—John P. Silverstrim
*Attorney*—Olson, Trexler, Wolters & Bushnell

[57]  ABSTRACT

A bicycle fork stem lock installed either at the time of manufacture of a bicycle or subsequently, the lock including a slide bolt projecting from the fork stem into the upper bearing cup and preferably also into the head frame, the bicycle fork stem and upper head bearing cup being of standard size.

5 Claims, 18 Drawing Figures

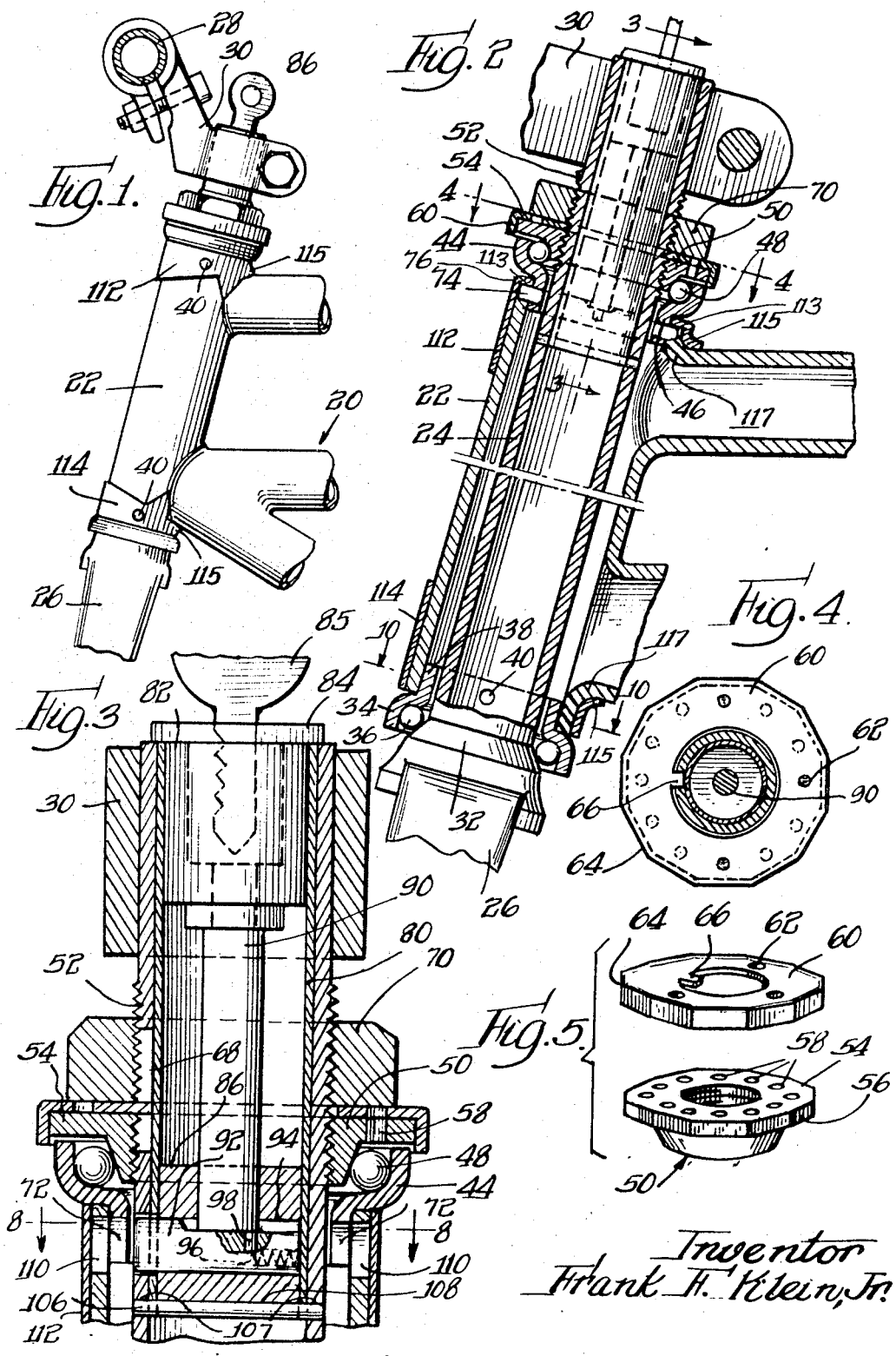

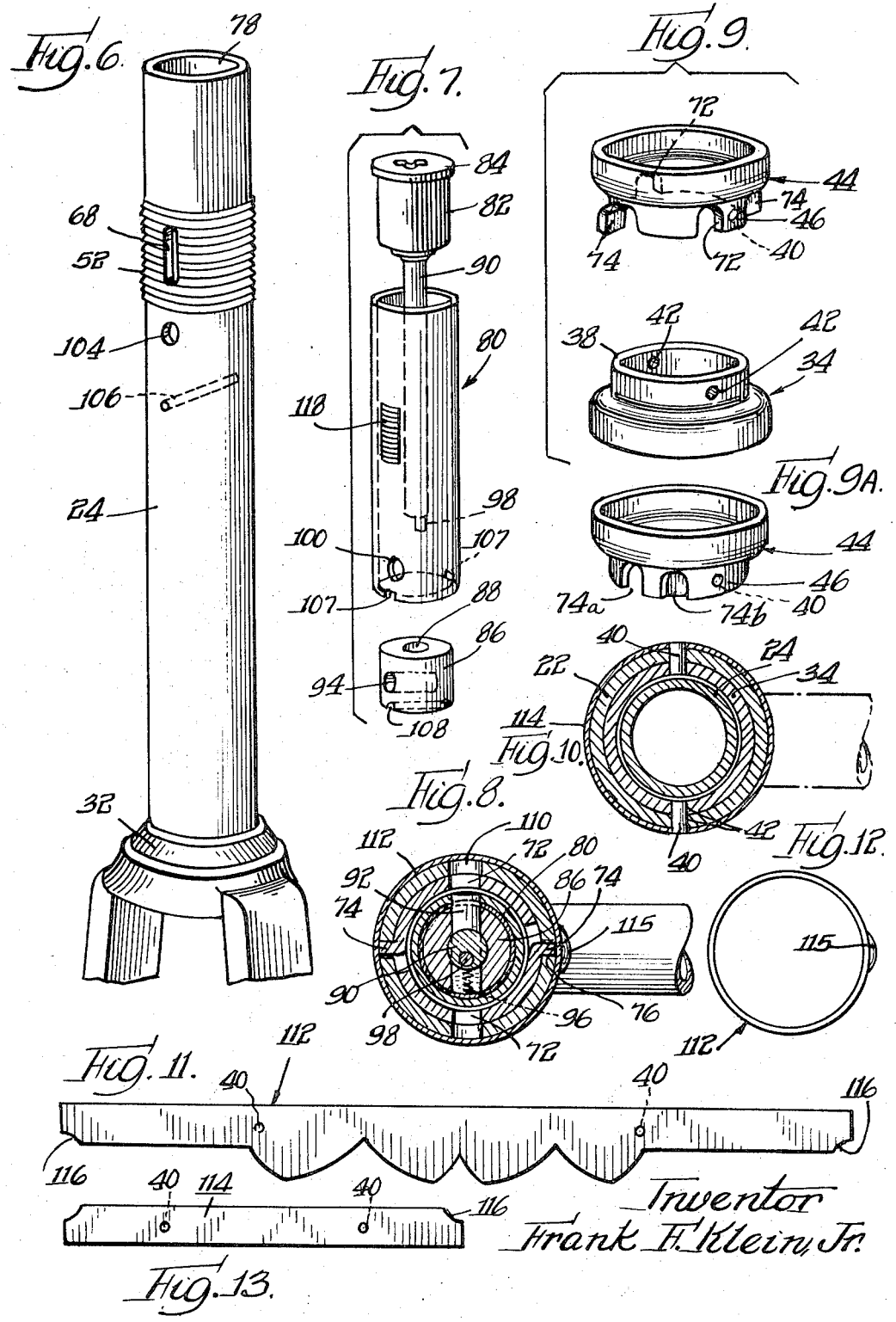

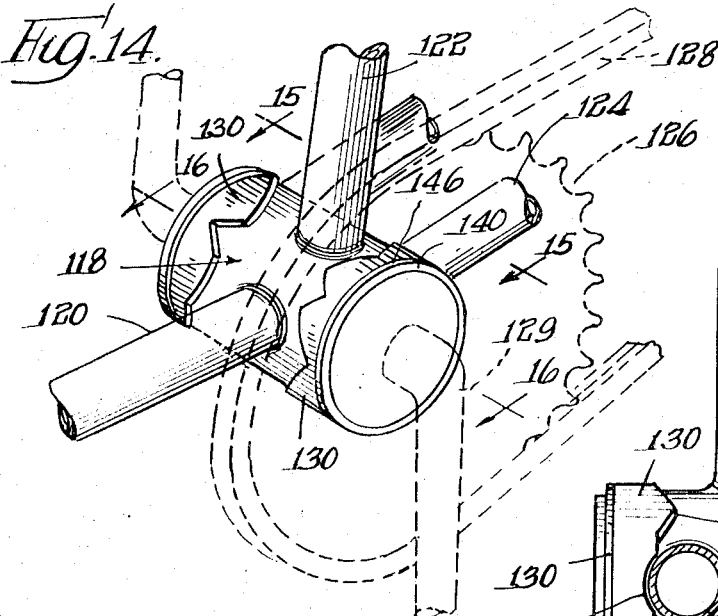
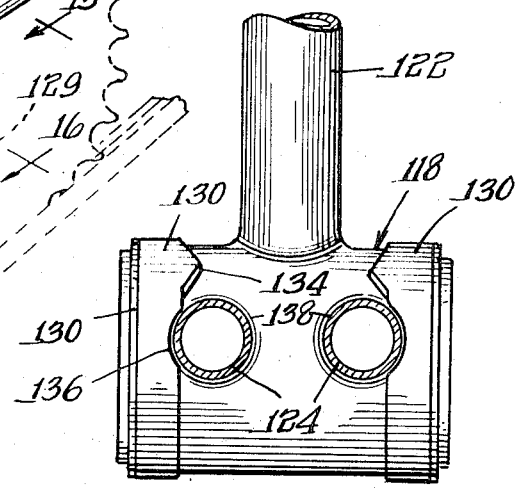
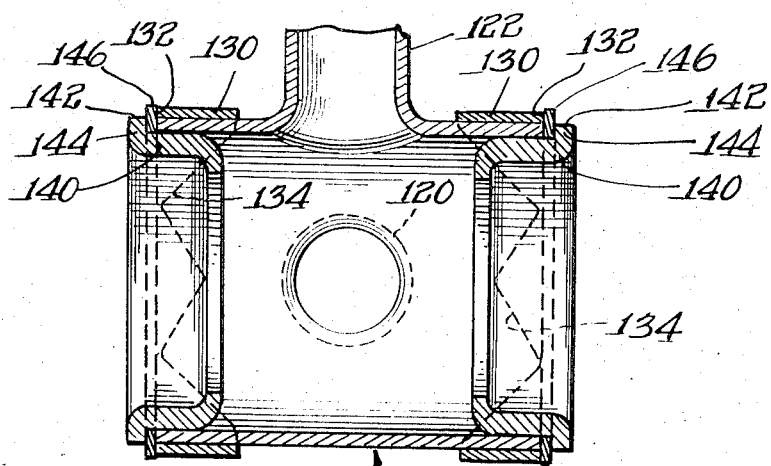
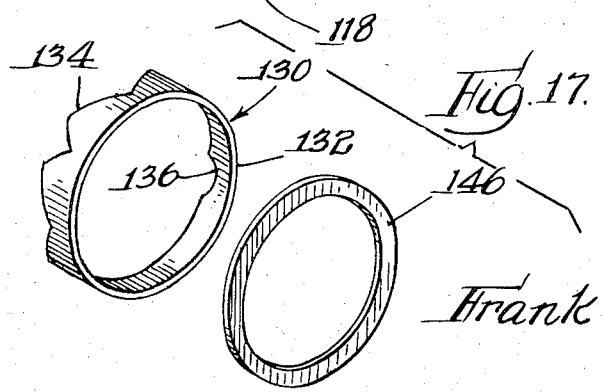

BICYCLE STEM LOCK

This is a division of application Ser. No. 771,080, filed Oct. 28, 1968, now U.S. Pat. No. 3,660,995, the latter being a continuation-in-part of my application Ser. No. 618,004, filed Feb. 23, 1967, now abandoned.

This invention relates to the bicycle art, and more particularly to an optionally includable steering lock for bicycles and the like.

In my prior U. S. Pat. No. 3,136,149, issued June 9, 1964, for "Bicycle Lock," I have disclosed and claimed a simple and highly effective fork stem lock for a bicycle or the like. The structure in my aforesaid patent is inexpensive, and can be installed during manufacture of the bicycle, or at a later time. It requires a slight modification of the standard bicycle fork stem, namely a fork stem that is somewhat higher than the usual practice. In many respects this is quite desirable, since it is something different, and hence something well desired by some people. On the other hand, it precludes fitting of the bicycle into a standard bicycle shipping carton, and this is sometimes undesirable.

Accordingly, it is an object of the present invention to provide a new and improved bicycle fork stem lock which is optionally includable, and which operates in conjunction with a bicycle fork stem of standard height.

It is further an object of the present invention to provide a bicycle fork stem lock wherein a slide bolt locks the stem to the upper bearing cup, and wherein the upper bearing cup is positively locked against rotation relative to the head frame.

A further object of this invention is to provide a bicycle fork stem lock in which the locked form stem canot be withdrawn downwardly from the head frame in case of theft.

Yet another object of the present invention is to provide a bicycle fork stem lock wherein slots, holes, etc. in the head frame are covered by an ornamental band or European style head lug fittings.

Other and further objects and avantages of the present invention will be apparent from the following description when taken in connection with the accompanying drawings, wherein:

FIG. 1 shows the upper forward portion of a typical tubular frame bicycle incorporating the features of the present invention;

FIG. 2 is a vertical longitudinal view, partially in section, through the structure of FIG. 1;

FIG. 3 is a longitudinal further section similar to FIG. 2 on an enlarged scale;

FIG. 4 is a generally horizontal view partially in cross section, taken substantially on the line 4—4 of FIG. 2;

FIG. 5 is an exploded perspective view showing the locking washer and bearing cone nut of FIGS. 3 and 4;

FIG. 6 is a perspective view showing the fork stem and a portion of the fork;

FIG. 7 is an exploded perspective view of the locking structure to be associated with the fork stem of FIG. 6;

FIG. 8 is a substantially horizontal cross sectional view taken along the line 8—8 of FIG. 3;

FIG. 9 is a perspective view showing the upper and lower bearing cups;

FIG. 9A is a perspective view of a modified upper bearing cup;

FIG. 10 is a generally horizontal cross sectional view taken substantially along the line 10—10 of FIG. 2;

FIG. 11 is a layout view of the ornamental band or head lug fitting before application to the head frame;

FIG. 12 is a top view of the completed head lug fitting on a reduced scale;

FIG. 13 is a layout view similar to FIG. 11 on a reduced scale showing a modified band;

FIG. 14 is a perspective view of the crank hanger portion of a bicycle, showing the ornamental bands of the present invention applied thereto;

FIG. 15 is a fragmentary view partly in section, taken substantially along the line 15—15 in FIG. 14;

FIG. 16 is an axial sectional view through the crank hanger, as taken substantially along the line 16—16 in FIG. 14; and FIG. 17 is an exploded perspective view showing an ornamental band for the crank hanger, and a retaining ring therefor.

The present application comprises a continuation-in-part of my copending application Ser. No. 618,004, filed Feb. 23, 1967, for Bicycle Stem Lock.

Referring now in greater particularity to the drawings, and first to FIGS. 1–3, there will be seen a portion of a bicycle frame 20, particularly including a substantially vertical, but slightly backwardly leaning, upright forward or tubular head portion or head frame 22. The fork stem 24 is of generally conventional construction, differing only slightly therefrom as will be pointed out hereinafter, is secured to the fork sides 26 in the usual manner, and is journaled within the tubular head portion as hereinafter will be set forth. A handle bar 28 is secured slightly above and forwardly of the top end of the fork stem by means of a bracket 30, and this may be of any conventional type, or it may be the bracket shown in my prior U.S. Pat. No. 3,136,149, heretofore mentioned. A bearing cone 32 is provided at the bottom of the fork stem and at the top of the fork, in accordance with the usual practice. The bearing cone 32 is seen also in FIG. 6. Within and extending from the bottom of the tubular head frame 22 is a bearing cup 34 of generally conventional construction, and in accordance with the usual practice, the bearing balls 36 are disposed between this cup and the cone 32, and may be positioned by a bearing retainer. The upper, tubular portion 38 of the bearing cup (see also FIG. 9) forms a press fit in the bottom end of the tubular head frame 22. In addition, diametrically opposed pins 40 are received in complementary apertures 42 in the head frame and in the cylindrical portion 38 of the cup. As will be apparent, the fork stem 24 forms a fairly close fit within the cylindrical portion 38, this fit being closer than the metal thickness of the head frame 22. Consequently, the pins 40 cannot be driven into the interior of the head frame to release the cup for downward withdrawal until after the fork stem has been withdrawn.

Similarly, at the upper end of the tubular head frame, there is an upwardly facing bearing cup 44 having a tubular portion 46 forming a press fit within the upper end of the head frame. The bearing cup is of conventional overall height, and differs somewhat from the conventional as will be pointed out shortly hereinafter. A plurality of ball bearings 48 is received in the cup, and may be provided with a bearing retainer in accordance with conventional practice. A bearing cone or nut 50 is internally threaded, and is threaded onto a roller external thread section 52 (see also FIG. 6) near the upper end of the fork stem 24. The cone 50 is provided at its upper portion with a radially extending flange 54, and in accordance with the invention as disclosed and claimed in my copending application Ser. No. 380,383, filed July 6, 1964, for "Bearing Construction for Bicycles and the Like" (allowed Oct. 10, 1966), and particularly FIGS. 9, 10, and 11 thereof, the flange 54 is provided with a polygonal exterior 56. Axially directed apertures 58 pass through the flange 54 to facilitate oiling of the bearing balls 48. A washer 60 of complementary shape, and having a limited number of access holes 62 therein capable of alignment with the apertures 58, immediately overlies the flange 54 of the bearing cone 50. A depending polygonal flange 64 encircles the polygonal periphery 56 of the bearing cone to lock the cone to the washer against rotation. A radially inwardly extending tongue 66 on the washer 60 is received in a vertical slot 68 through the threads 52 on the fork stem, whereby to lock the washer rotationally to the fork stem. Thus, when the washer has been lowered in place in encircling relationship with the bearing cone 50, the bearing cone cannot rotationally loosen on the threads 52 to lead to a sloppy bearing fit. A nut 70 is turned down on top of the washer to hold it against the top of the bearing cone 50. This is all explained in considerable detail in my aforesaid copending application Ser. No. 380,383. It will be noted that the particular nut and washer construction is of low over-all height which reduces the standard length of the fork stem proper.

As has been observed previously, the upper bearing cup 44 is of standard height and generally conventional construction. However, as will be seen in FIG. 2, and particularly in FIG. 9, the depending flange 46 is provided with one or more notches 72 for receipt of a locking bolt hereinafter to be disclosed. The notches 72 open edgewise downwardly of the cylindrical portion 46. In order to lock the bearing cup 44 rotationally to the head frame, the bearing cup is provided with diametrically spaced radially outwardly struck ears 74, and these ears are received in complementary edgewise upwardly opening recess means comprising notches 76 at the top of the head frame. This rotational locking is in addition to the usual press fit. Alternatively, notches can be provided in the cup which interfit with inwardly struck ears at the top of the head frame. Thus, in FIG. 9A the bearing cup 44 is shown with slots 74a for receipt of ears on the head frame. As a further alternative or supplement, the cup 44 in FIG. 9A is shown with recess means comprising depressions or dimples 74b for receipt of complementary inward protuberances on the head frame.

The fork stem 24 is open at the top as indicated at 78, and if the bicycle is shipped with no lock, a plug, such as of plastic, is inserted in the open top. The lock mechanism as hereinafter set forth may be incorporated during manufacture instead of this plug, or the plug may subsequently be removed and the lock mechanism installed. The lock mechanism is readily seen in FIGS. 2, 3, 7, and 8, and includes a cylinder, tube, or sleeve 80. The sleeve 80 need not be particularly strong, and can be formed of thin gauge metal or of plastic. A lock cylinder 82 of conventional construction is tightly received in the upper end of the sleeve 80, and preferably has associated therewith a washer-like structure or flange 84 for overlying the top end of the sleeve 80 and also the parting line between the sleeve 80 and the fork stem 24. The lock cylinder 82 is of any suitable known construction, and is turnable by means of a key 85.

At the opposite end of the sleeve there is received, as by a force fit, a locking bolt plug 86. This may be of any suitable material, and I contemplate that plastic material might be preferred as a cost saving feature. The plug 86 is cylindrical, and has an axial bore 88 oepning at the top for receipt of a lock shaft 90 depending from and turning with the cylinder 82. A lock bolt or pin 92 is diametrically reciprocable in a complementary bore 94 in the lock plug, and is biased by a spring 96 toward outward or locking position. An eccentric pin 98 on the bottom of the lock shaft 90 is received in a notch on the side of the locking bolt 92 for reciprocating the lock bolt upon turning of the cylinder 82 and depending lock shaft 90. A similar mechanism is shown and described in great detail in my previously mentioned U.S. Pat. No. 3,136,149.

The sleeve 80 is provided with a lateral aperture 100 through which the locking bolt 92 may project. Similarly, the fork stem 24 is provided with a lateral aperture 104 through which the locking bolt may project. To insure proper alignment of the locking bolt with the aperture 104, a diametral cross pin 106 is provided at the proper elevation in the fork stem 24. The bottom edge of the sleeve 80 is provided with diametrically opposed notches 107 for receipt of the pin, and the bottom end of the lock plug 86 is provided with a complementary semi-cylindrical diametral groove 108 for receipt of the pin. Alternatively to the pin, the form stem 24 could have inwardly struck ears to be received in notches in a groove in the sleeve 80 and plug 86.

The locking bolt 92 is capable of alignment with one of the notches 72 in the upper bearing cup 44. Upon proper turning of the fork stem and extension of the locking bolt by turning of the key 86, the locking bolt will enter one of the notches 72, thus preventing the bicycle from being steered, and hence from being ridden. Preferably, for greatest locking strength, apertures 110 are provided in the head frame 22 in alignment with the notches 72. Thus, the bolt 92 preferably can extend into the head frame as well as into the upper bearing cup, providing a stronger and more positive lock.

For illustrative purposes, the notches 72 and apertures 110 have been shown as being at right angles to the fore and aft direction of the bicycle. This means that the handle bar and front wheel must be turned 90° from either direction of straight ahead for locking. However, this is not essential, as other angles could be used, or the wheel could be locked in a straight ahead position.

I provide an upper ornamental band or collar 112 which encircles the notches 76 which receive the ears 74, and which also covers the apertures 110. This prevents thieves and the like from attempting manually to depress the latch bolt, and also provides a more pleasing appearance while avoiding the opportunity for corrosion, mischief, etc. A generally similar lower band or collar 114 is provided at the bottom of the head frame 22 which is generally similar to the band 112. However, one significant difference is that the band 112 preferably is provided at its upper edge with inwardly directed ears 113 which extend through their notches 76 and overlie the ears 74. The bands or collars may be of plastic or metal, and can be of different shapes or designs, such as is common in European headlug fittings. However, it should be noted that they are not tubular fittings for joining the various portions of the bicycle frame together. Generally speaking, the bands or collars are tapered or thinner in an axial direction at the back portions than at the front, and also are flared at the back portions to fit over the fillets where the head frame is joined to the rearwardly extending frame members of the bicycle. This interfitting, coupled with the holding down of the bands or collars by the respective bearing cups centers and holds the bands or collars in position. In addition, pins 40 are passed through the bands or collars, and through the tubular head frame and bearing cups, to prevent unauthorized disassembly of the parts. One satisfactory ornamental band 112 is shown in layout fashion in FIG. 11, notches or concavities 116 being provided for cooperating with the tubular frame member when the flat or layout blank of FIG. 12 is rolled into a ring or band and butt-welded or otherwise secured. The completed band is seen in reduced scale in FIG. 12 (with the exception that the inwardly directed ears 113 are omitted from FIGS. 12 and 13), and the material is flared out at 115 for fitting over the fillets 117 (FIG. 2) where the head frame is welded to the rearwardly extending frame members. The upper bearing cup holds the ring or collar 112 down so that the flare 155 and notch 116 tightly engage the fillet 117, whereby the collar or band cannot rotate on the head frame.

In FIG. 13 there is shown, on a reduced scale, a lower band or collar 114 of plain design, and, with the notches 116 on the upper corners, a flare again is formed, and the flare and notches prevent rotation, the ring being held up by the lower bearing cup. While reference has been made in connection with both the upper and lower bands of notches and flares in combination, it will be understood that either a notch or a flare alone of proper size and configuration would be capable of preventing rotation. Also, other ornamental designs can be used, and the lower band need not be plain.

Although not specifically shown herein, since it is a known feature — for example, in my prior U.S. Pat. No. 3,136,149 —, the locking cylinder 82, in addition to fitting by a press fit, may be pinned in place in the upper end of the fork stem. Such pin would, of course, be covered by the handle bar bracket 30. Since the interior of the fork stem 24 is of uniform diameter, the lock unit, including the sleeve 80, the plug 86, and the cylinder 82 may be entirely omitted during manufacture of the bicycle, and easily slipped into place at a later date. In this new lock design the locking bolt will extend into the fork stem proper 24 when the bicycle is in the unlocked position and is compressed therein when the fork unit is removed for service.

It will be appreciated that should someone steal a bicycle locked with the present lock, and attempt to disassemble the structure by removing the handle bar bracket and the retaining nut 70 along with the upper bearing cone, he would be doomed to failure. The projecting locking bolt would prevent the fork stem from being pulled through the lower bearing cup, and the lower bearing cup cannot be removed under the circumstances, since the pins 40 cannot be driven inwardly until after the fork stem has been completely removed.

It will be seen that the objects of the invention have been attained. The lock is optionally includable during manufacture of the bicycle, or may be inserted at a later date. The fork stem is of generally conventional construction, and is of conventional height, whereby a bicycle incorporating the present invention can be shipped in a shipping carton of standard size. Furthermore, the upper bearing cup is of standard size, and has modifications that readily can be made in a sheet metal working machine. Furthermore, the superior upper bearing cone locking and oiling structure of my U.S. Pat. No. 3,306,684, which issued Feb. 28, 1967, is included.

In the event that the entire locking unit should need to be removed for servicing, upon removal of the upper structure from the fork stem, particularly including the nut 70 and bearing cone 50, a small punch can be angled up through the slot 68 and rapped with a hammer to raise the sleeve 80. To facilitate this end, the sleeve preferably is formed with small grooves 118 (FIG. 7, conveniently rolled or stamped in place.

In one practical embodiment of the invention, the fork stem tubing has a 0.965 inch outside diameter, and a 0.750 inch inside diameter. A thread rolling die is readily passed over the end of the fork stem tubing to the point necessary for rolling the threads 52 thereon, the threads in this specific example having an axial length of ⅞ inch. It is then unnecessary to perform any other machine work on the end of the fork stem tubing, thus materially reducing the cost of the structure. Upon rolling of the threads, the crests thereof come to a one-inch outside diameter. Thus, the bearing cone 50 and nut 70, along with the head washer 60, can be slipped over the end of the tubing and down to the threaded portion thereof without difficulty.

When there is to be an authorized removal of the fork stem and associated parts from the head frame, the handle bar bracket 30, the nut 70, the washer 60, and the bearing cone 50 are removed. The upper bearing cup 44 is also removed, and the locking bolt is pressed back into unlocked position (bearing in mind that it is spring pressed outwardly) and held in place with a tool comprising a small length of tubing with a one inch inside diameter, and a 1-1/16 inch outside diameter slipped over the fork stem to hold the locking bolt in retracted or depressed position. This tube sleeve tool is then removed with the lock and fork stem for service.

Ornamental bands in accordance with the present invention are applicable also to the crank hanger of a bicycle, as well as to the tubular head frame. Such use of ornamental bands is shown in FIGS. 14–17, to which reference should now be had. A cylindrical crank hanger 118 is shown in FIGS. 14–16, and has secured thereto the usual frame members, including the member 120 extending forwardly and upwardly to the tubular head frame, the upright member 122 extending up to the vicinity of the saddle, and the two spaced rearwardly extending members 124 suspending the rear wheel. A crank assembly is generally associated with the crank hanger, but the details thereof are not of particular importance to the present invention, and therefore associated parts are shown in broken lines, including the usual sprocket 126, chain 128, and crank 129 on which the pedals are mounted.

Mirror image ornamental bands 130 are provided at opposite ends of the crank hanger, fitting closely thereon, and having a planar outer end 132 and an ornamental inner edge which may be scalloped or otherwise configured as indicated at 134. In addition, each band on the edge opposite the planar end 132 is provided with an arcuate notch 136 engageable with the fillet 138 at the juncture between the rearwardly extending frame members 124 and the crank hanger 118. The surface of the band may also be slightly tapered in this area to accommodate to the fillet. As will be apparent, engagement of the notch 136 with the fillet 138 limits the inward movement of each band as it is installed, and further precludes rotation of the bands on the crank hanger. (There are similar fillets at the bases of the frame members 120 and 122, but these are not important to the present invention.)

In the case of the tubular head frame, the bearing cup is of sufficient external diameter so as diametrically to overlie the ornamental band. However, it is common practice in a crank hanger to use bearing cups 140 received in the ends of the crank hanger and having maximum diameters at 142 which are no greater than, and may be slightly less than the exterior diameter of the cylindrical crank hanger itself. Thus, the circumferential flange 144 at the outer end of each crank hanger cannot be relied on to hold the ornamental bands in position. Accordingly, rather than provide special bearing cups at increased cost, I provide a washer 146 of relatively large diameter and of narrow radial extent which fits over each bearing cup and is trapped against the respective end of the crank hanger 118 by the outwardly directed flange 144 of the bearing cup. The external diameter of the washer is sufficient to preclude unauthorized endwise withdrawal of each ornamental band, and the external diameter is shown as being slightly greater than the outside diameter of the adjacent band in each instance. As will be understood, the bearing cups form a rather tight fit in the crank hanger, and are not likely to come out accidentally. Furthermore, a crank assembly inserted therein positively holds the bearing cups in place.

Although the ornamental bands have separate utility for use on the crank hanger, it will be apparent that, insofar as the bands are used on the head frame, they are inextricable from the lock mechanism. Thus, the pins 40 secure both the ornamental band and the bearing cup to the top of the tubular head frame. Part of the latch strike is in the bearing cup, and part in the tubular head frame, and both parts are covered by the ornamental band to prevent tampering. Furthermore, the inwardly directed flanges or ears on the ornamental band interfit with the notches at the top of the tubular head frame, and the ears on the bearing cup also interfit with these notches, whereby proper orientation of the bearing cup relative to the head frame is insured, and yet the notches are thoroughly protected.

It is to be emphasized that the bands in the present invention are ornamental in nature, and are functional in cooperation with the lock mechanism, but are distinguished from the lugs common on European bicycles which are used for brazing the various frame parts together. The bands in the present invention are removable, and are not a part of the frame construction.

The specific example of the invention as herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. In a tubular frame vehicle comprising a substantially upright tubular head having upper and lower ends and having rearwardly extending tubular frame means joined thereto adjacent said ends, a readily removable ornamental band substantially free of lateral extensions encircling only said tubular head adjacent one of said ends and free of adherence thereto, and a bearing cup received in said tubular head and having a radially projecting portion projecting ourwardly past and thereby holding said band thereon adjacent said rearwardly extending frame means, said bearing cup comprising the sole restraining force holding said band on said head.

2. The combination set forth in claim 1 wherein said frame means is joined to said head frame at a fillet, and wherein said band is shaped complementary to said fillet to position said band circumferentially rotationally of said head frame.

3. The combination set forth in claim 2 wherein the complementary shape includes a flare.

4. A tubular frame vehicle comprising an open-ended cylindrical member adapted to have a part rotatably journaled therein and having tubular frame means extending transversely therefrom adjacent one end, a readily removable ornamental band substantially free of lateral extensions encircling only said cylindrical member adjacent said end and free of adherence thereto, and a bearing cup received in said cylindrical member including a tubular portion received within the open end of said cylindrical member, and means forming a part of said bearing extending radially outwardly of said tubular portion beyond said cylindrical member and at least radially overlapping said ornamental band comprising the sole means to retain said band on said cylindrical member adjacent said transversely extending frame means.

5. A tubular frame vehicle comprising a cylindrical member which is open-ended for journaling of a rotating part therein, tubular frame means joined to said cylindrical member and adjacent one end and forming a fillet therewith and extending transversely of said cylindrical member, and a removable ornamental band encircling only said cylindrical member and adjacent said end, said band being shaped complementary to said fillet to position said band circumferentially of said cylindrical member and further including a washer between said bearing cup and said band, said washer having an inside diameter held by said bearing cup and an outside diameter holding said band.

* * * * *

UNITED STATES PATENT OFFICE
CERTIFICATE OF CORRECTION

Patent No. 3,785,676      Dated JANUARY 15, 1974

Inventor(s) FRANK F. KLEIN, JR.

It is certified that error appears in the above-identified patent and that said Letters Patent are hereby corrected as shown below:

Column 1, line 35, change "can_ot" to --cannot--
Column 1, line 42, change "a_vantages" to --advantages--
Column 3, lines 3-4, change "roller" to --rolled--
Column 4, line 35, change "form" to --fork--
Column 5, line 31, change "155" to --115--
Column 8, line 28, delete "rotationally"
Column 8, line 55, after "member" delete "and"

Signed and sealed this 7th day of May 1974.

(SEAL)
Attest:

EDWARD M. FLETCHER, JR.
Attesting Officer

C. MARSHALL DANN
Commissioner of Patents